(12) United States Patent
Chen et al.

(10) Patent No.: US 10,030,699 B2
(45) Date of Patent: Jul. 24, 2018

(54) AEROSTATIC BEARING

(71) Applicant: METAL INDUSTRIES RESEARCH & DEVELOPMENT CENTRE, Kaohsiung (TW)

(72) Inventors: Tsai-Fa Chen, Kaohsiung (TW); Kuo-Yu Chien, Kaohsiung (TW)

(73) Assignee: METAL INDUSTRIES RESEARCH & DEVELOPMENT CENTRE, Kaohsiung (TW)

(*) Notice: Subject to any disclaimer, the term of this patent is extended or adjusted under 35 U.S.C. 154(b) by 302 days.

(21) Appl. No.: 15/183,221

(22) Filed: Jun. 15, 2016

(65) Prior Publication Data

US 2016/0298679 A1 Oct. 13, 2016

Related U.S. Application Data

(63) Continuation of application No. 14/533,184, filed on Nov. 5, 2014, now Pat. No. 9,400,010.

(30) Foreign Application Priority Data

May 27, 2014 (TW) .............................. 103118505 A

(51) Int. Cl.
*F16C 29/02* (2006.01)
*F16C 32/06* (2006.01)

(52) U.S. Cl.
CPC ........ *F16C 29/025* (2013.01); *F16C 32/0603* (2013.01); *F16C 32/0614* (2013.01); *F16C 32/0618* (2013.01); *F16C 32/0622* (2013.01); *F16C 32/0666* (2013.01); *F16C 2220/66* (2013.01); *F16C 2223/30* (2013.01)

(58) Field of Classification Search
CPC .............. F16C 2220/66; F16C 2223/30; F16C 29/025; F16C 32/0603; F16C 32/0618; F16C 32/0622; F16C 32/0666
See application file for complete search history.

(56) References Cited

U.S. PATENT DOCUMENTS

| | | | |
|---|---|---|---|
| 3,169,807 A | 2/1965 | Abel et al. | |
| 4,269,458 A | 5/1981 | Olsson et al. | |
| 4,741,629 A | 5/1988 | Hooykaas | |
| 4,793,201 A | 12/1988 | Kanai et al. | |
| 5,407,280 A * | 4/1995 | Heinzl | B82Y 15/00 384/100 |

(Continued)

FOREIGN PATENT DOCUMENTS

| | | |
|---|---|---|
| CN | 1005009 B | 8/1989 |
| JP | 60-241566 A | 11/1985 |
| JP | 4586378 B2 | 11/2010 |

OTHER PUBLICATIONS

Taiwanese Office Action dated Nov. 26, 2015 for Taiwanese Patent Application No. 103118505, 6 pages.

(Continued)

*Primary Examiner* — Jacob Cigna
(74) *Attorney, Agent, or Firm* — Jackson IPG PLLC; Demian K. Jackson

(57) ABSTRACT

An aerostatic bearing includes a base having a foundation layer and a plurality of ventilation bodies protruding from the foundation layer, the ventilation bodies being made of a porous material; and a sealing layer covering the base and revealing at least one of the ventilation bodies.

17 Claims, 10 Drawing Sheets

(56) References Cited

U.S. PATENT DOCUMENTS

| | | | |
|---|---|---|---|
| 5,564,063 A | 10/1996 | Heinzl et al. | |
| 5,800,066 A | 9/1998 | Hayashi | |
| 6,307,620 B1* | 10/2001 | Takabayashi | G03F 7/707 |
| | | | 355/53 |
| 6,341,421 B1 | 1/2002 | Kumamoto et al. | |
| 6,695,479 B2 | 2/2004 | Pohn et al. | |
| 6,872,002 B2 | 3/2005 | Tomita et al. | |
| 7,161,662 B2* | 1/2007 | Ottens | G03F 7/707 |
| | | | 279/128 |
| 7,207,720 B2 | 4/2007 | Sai et al. | |
| 7,604,439 B2 | 10/2009 | Yassour et al. | |
| 7,607,647 B2 | 10/2009 | Zhao et al. | |
| 7,871,200 B2 | 1/2011 | Hur et al. | |
| 8,973,848 B2 | 3/2015 | van der Steur et al. | |
| 9,005,365 B2 | 4/2015 | Bulovic et al. | |
| 2008/0151213 A1 | 6/2008 | Arai | |
| 2013/0217554 A1* | 8/2013 | Hanyu | B65G 39/00 |
| | | | 492/33 |
| 2014/0283679 A1 | 9/2014 | Muhle et al. | |
| 2014/0286599 A1 | 9/2014 | Devitt et al. | |

OTHER PUBLICATIONS

American Office Action dated Feb. 23, 2016 for U.S. Appl. No. 14/533,184, 13 pages.

* cited by examiner

AEROSTATIC BEARING

This application is a continuation application of U.S. Ser. No. 14/533,184, filed Nov. 5, 2014, which claims priority under 35 U.S.C. § 119(a) on Patent Application No(s). 103118505, filed in Taiwan, Republic of China on May 27, 2014, the entire contents of which are hereby incorporated by reference.

BACKGROUND OF THE INVENTION

1. Field of the Invention

The present invention relates to an aerostatic bearing, and more particularly, to a porous aerostatic bearing.

2. Background of the Invention

With reference to FIG. 1, a conventional porous aerostatic bearing includes a substrate 11 and a porous layer 12 disposed under the substrate 11, wherein the substrate 11 includes a through hole 111 communicating with the porous layer 12. Air can transmit into the porous layer 12 via the through hole 111, and an gas membrane is generated when the air passes through the micro pores of the porous layer 12. Therefore, the aerostatic bearing is spaced apart from a platform 13 and floats on the platform 13.

There are several types of conventional restrictive technologies in the field of aerostatic bearing. For the aerostatic bearing with the form of porous restriction, the device surface is filled with micro openings and its micro-porosity structure may have excellent fluid damping characteristic, which possesses better performance of gas-membrane rigidity, bearing capacity and dynamic stability, compared with the pore type, slit type or slot type aerostatic bearing. When the porous aerostatic bearing is applied as a plane bearing of straight slideway or a rotation bearing of precision spindle, the porous aerostatic bearing possesses the advantages of simple design, miniature, ultra precision and high dynamic stability.

In the pressure distribution of gas membrane within all types of restriction technologies, the gas membrane generated by aerostatic bearing with the form of porous restriction theoretically possesses the highest bearing capacity, stability and uniformity. However, the features of the pore size, porosity and penetrance in porous material are not distributed uniformly due to manufacture variance. Since the pore size and porosity are the key factors to effect permeability of air, if the permeability of air is not uniform, the bearing capacity and stability will be affected as well. In addition, in a conventional porous aerostatic bearing, when the porous material is made, its air permeability is determined already. That is to say, the air permeability cannot be adjusted in the conventional porous aerostatic bearing. Accordingly, the porous aerostatic bearing still faces difficulties in practical industrial application.

SUMMARY OF THE INVENTION

An aerostatic bearing comprises a base having a foundation layer and a plurality of ventilation bodies protruding from the foundation layer, the ventilation bodies being made of a porous material; and a sealing layer covering the base and revealing at least one of the ventilation bodies.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE ILLUSTRATED EMBODIMENTS

Figure 1:
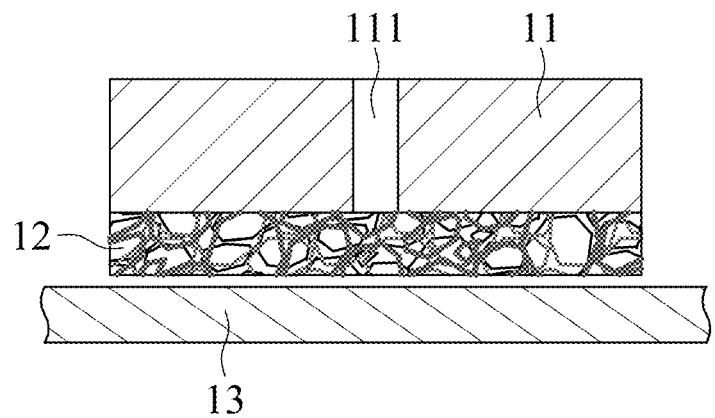
FIG. 1 is a conventional porous aerostatic bearing.

The present invention will now be described in detail with reference to the accompanying drawings, wherein the same reference numerals will be used to identify the same or similar elements throughout the several views. It should be noted that the drawings should be viewed in the direction of orientation of the reference numerals.

Figure 3A:
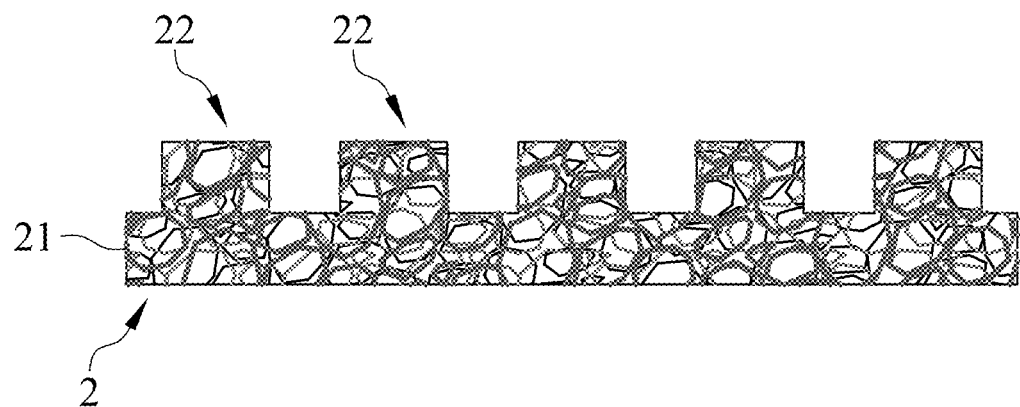
FIGS. 3A to 3D illustrate the manufacturing process of the first embodiment of the present invention.
Figure 3B:
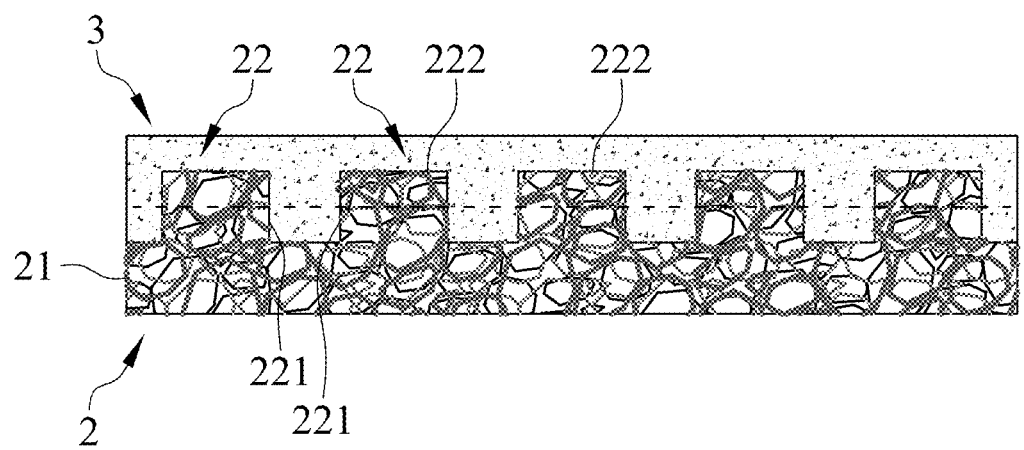
Figure 3C:
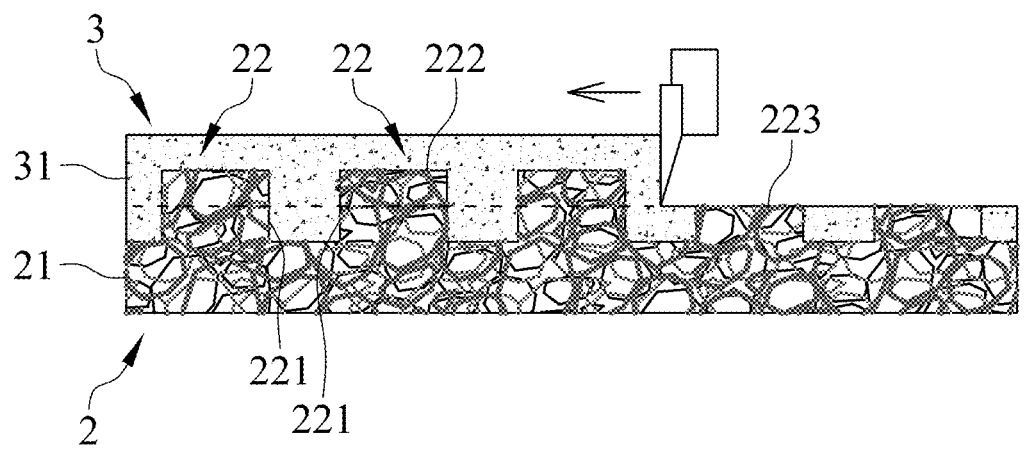
Figure 3D:
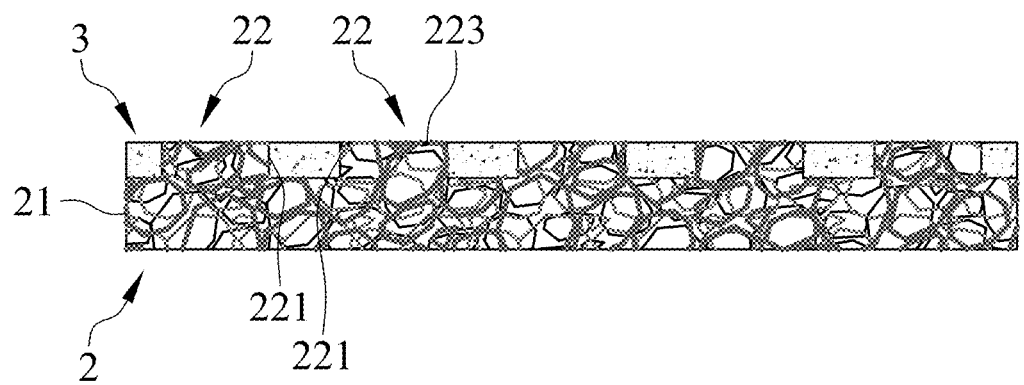
Figure 4:
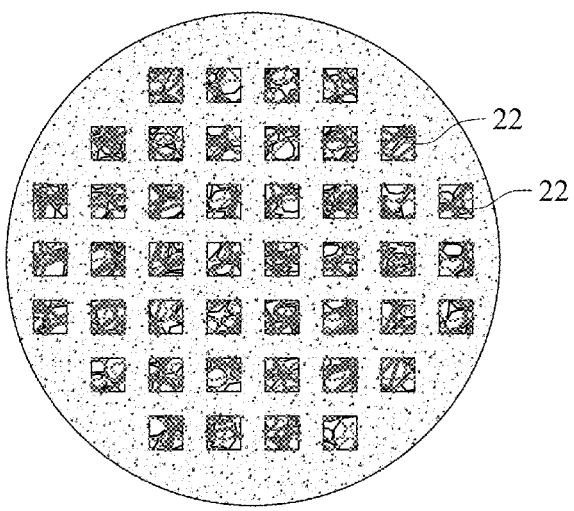
FIG. 4 is one distribution pattern of the ventilation bodies in accordance with the first embodiment of the present invention.

With reference to FIGS. 3D and 4, an aerostatic bearing in accordance with a first embodiment of the present invention comprises a base 2 and a sealing layer 3, wherein the base 2 comprises a foundation layer 21 and a plurality of ventilation bodies 22 protruding from the foundation layer 21, and each of the ventilation bodies 22 is made of a porous material and comprises an outer lateral periphery 221. The base 2 is covered with the sealing layer 3, the outer lateral periphery 221 of each of the ventilation bodies 22 is sealed by the sealing layer 3 for making two adjacent ventilation bodies 22 spaced apart by the sealing layer 3, and the ventilation bodies 22 are revealed by the sealing layer 3.

Figure 2:
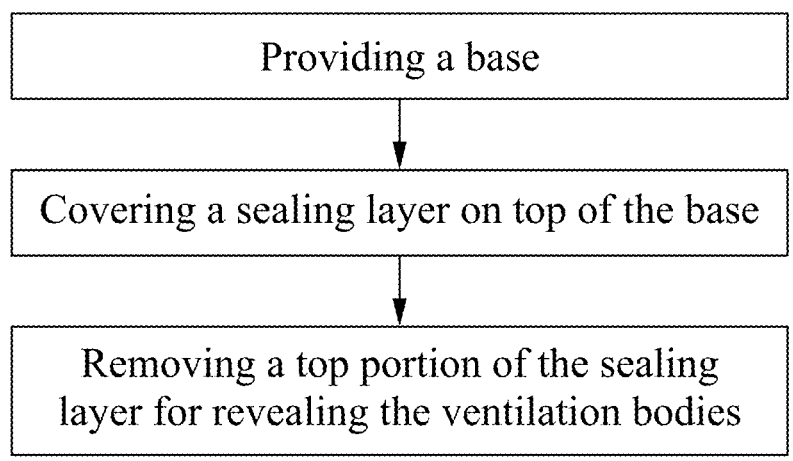
FIG. 2 is a manufacturing flow chart in accordance with a first embodiment of the present invention.

FIG. 2 is a manufacturing flow chart in accordance with a first embodiment of the present invention. First, the base 2 having the foundation layer 21 and the ventilation bodies 22 protruding from the foundation layer 21 is provided (see also FIG. 3A).

Next, a sealing layer 3 is covered on top of the base 2 (see also FIG. 3B), wherein the sealing layer 3 covers the ventilation bodies 22 and is filled between two adjacent ventilation bodies 22 so that the micro pores of the outer lateral periphery 221 and a top surface 222 of each of the ventilation bodies 22 are sealed by the sealing layer 3 and become airtight, wherein the sealing layer 3 is selected from one of a sealing gel or a metal membrane. If the sealing layer 3 is the sealing gel, a curing step may be performed after coating the sealing layer 3 onto the base 2 so as to cure the sealing gel. If the sealing layer 3 is the metal membrane, the metal membrane is deposited on the base 2 by vacuum sputtering, vacuum vaporization or ion implantation.

Next, a top portion 31 of the sealing layer 3 is removed by diamond cutting, thereby revealing a surface 223 of the ventilation bodies 22 (see FIG. 3C). It should be noted that the sealing layer 3 may be filled into deeper micro pores of the ventilation bodies 22. In order to make the ventilation bodies 22 more effective, the ventilation bodies 22 can be scraped slightly deeper while removing the top portion 31 of the sealing layer 3. Eventually, the aerostatic bearing is made as illustrated in FIG. 3D.

Figure 5:
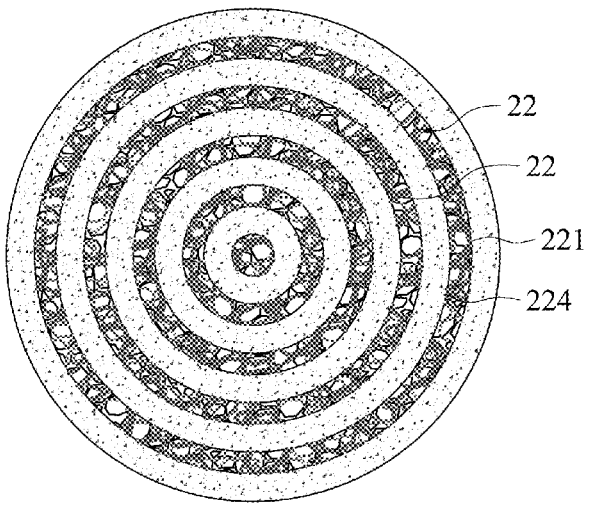
FIG. 5 is another distribution pattern of the ventilation bodies in accordance with the first embodiment of the present invention.

The distribution of the ventilation bodies 22 is designed according to the desired permeability and bearing-capacity of the aerostatic bearing. In an embodiment shown in FIG. 4, the ventilation bodies 22 are uniformly distributed/arranged on the foundation layer 21 in the form of rectangular block shape. In another embodiment shown in FIG. 5, the ventilation bodies 22 may be concentrically distributed/arranged on the foundation layer 21. If the ventilation bodies 22 are concentrically arranged, each of the ventilation bodies 22 further comprises an inner lateral periphery 224, and the sealing layer 3 seals the outer lateral periphery 221 and the inner lateral periphery 224 of each of the ventilation bodies 22.

In addition, in this embodiment, the ventilation bodies 22 and the foundation layer 21 are made of the same porous material. In production, a piece of porous material is processed by precision machining such as diamond turning, milling or Mill-turn complex cutting, thereby forming a plurality of ventilation bodies 22 spaced apart from each other.

Figure 6:
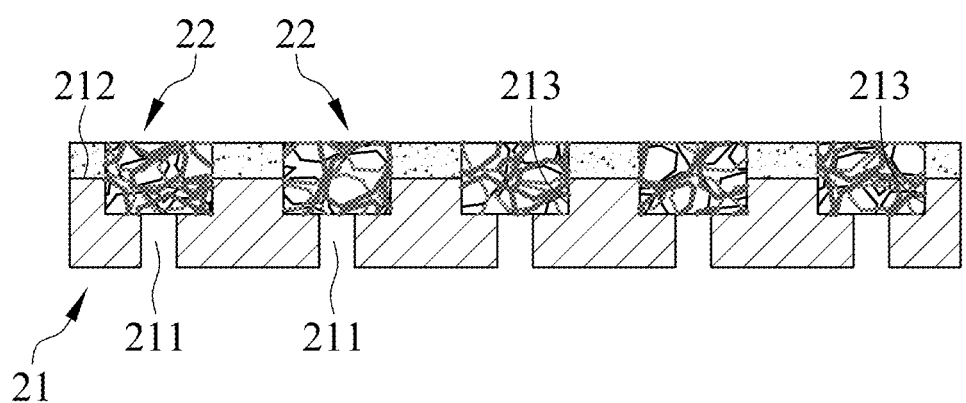
FIG. 6 is a foundation layer made of a substantially non-ventilative material in accordance with the first embodiment of the present invention.

The foundation layer 21 can be made of a porous material different from the porous material of the ventilation body 22. In another embodiment shown in FIG. 6, the foundation layer 21 is made of a substantially non-ventilative material such as metal and comprises a plurality of through holes 211. Each of the ventilation bodies 22 covers a corresponding one of the through holes 211. In the illustrated embodiment, a plurality of accommodating slots 213 are recessed into a top surface 212 of the foundation layer 21, the through holes 211 directly communicate with the accommodating slots 213, and the ventilation bodies 22 are disposed within the accommodating slots 213.

By processing a chunk of porous material to have a plurality of ventilation bodies 22, the aerostatic bearing maintains high stability and bearing capability. Furthermore, the distribution pattern of the ventilation bodies 22 is designed to generate desired pressure distribution. In the conventional aerostatic bearing made of a porous material, the permeability of the bearing is determined once the porous material has been made. Compared with the conventional aerostatic bearing, the present invention utilizes the distribution pattern of the ventilation bodies 22 to decide the resulting air permeability of the aerostatic bearing. Therefore, the resulting permeability is not entirely determined by the porous material itself but can be controlled/adjusted by the distribution pattern of the ventilation bodies 22, and the effect due to manufacturing variance process will be reduced and minimized. In addition, the conventional aerostatic bearing utilizes the whole chunk of porous material with an over-sized ventilation area which likely causes higher air consumption. In contrast, the present invention controls the ventilation area to aim at targeting bearing spots by using a plurality of smaller ventilation bodies 22 thereby lowering the entire air consumption and achieving the same bearing effectiveness.

Figure 8A:
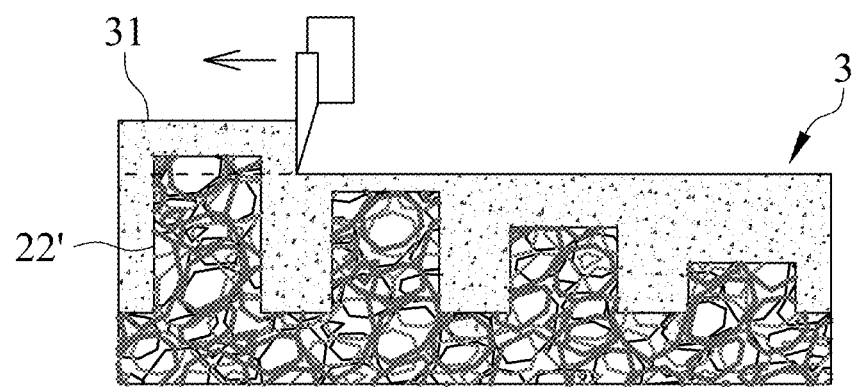
FIGS. 8A to 8D illustrate the manufacturing process of the second embodiment of the present invention.
Figure 8B:
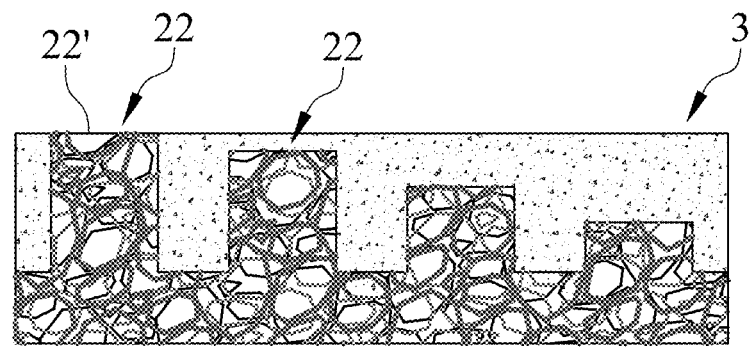

FIG. 8B illustrates a second embodiment of the present invention. The structure of the second embodiment is mostly the same as the first embodiment, except that the ventilation bodies 22 have different heights, and are arranged in an order from highest to lowest of the height thereof. The ventilation body 22' with the highest height is revealed by the sealing layer 3. In this embodiment, all the ventilation bodies 22 have different heights.

However, in another embodiment, there can be at least two groups of ventilation bodies 22, and the ventilation body or bodies 22 in the same group has/having the same height, and the ventilation bodies 22 in different groups have different heights. In addition, in one embodiment, the ventilation bodies 22 in the same group may be even distributed to create an evenly distributed ventilation intensity of the aerostatic bearing.

Figure 7:
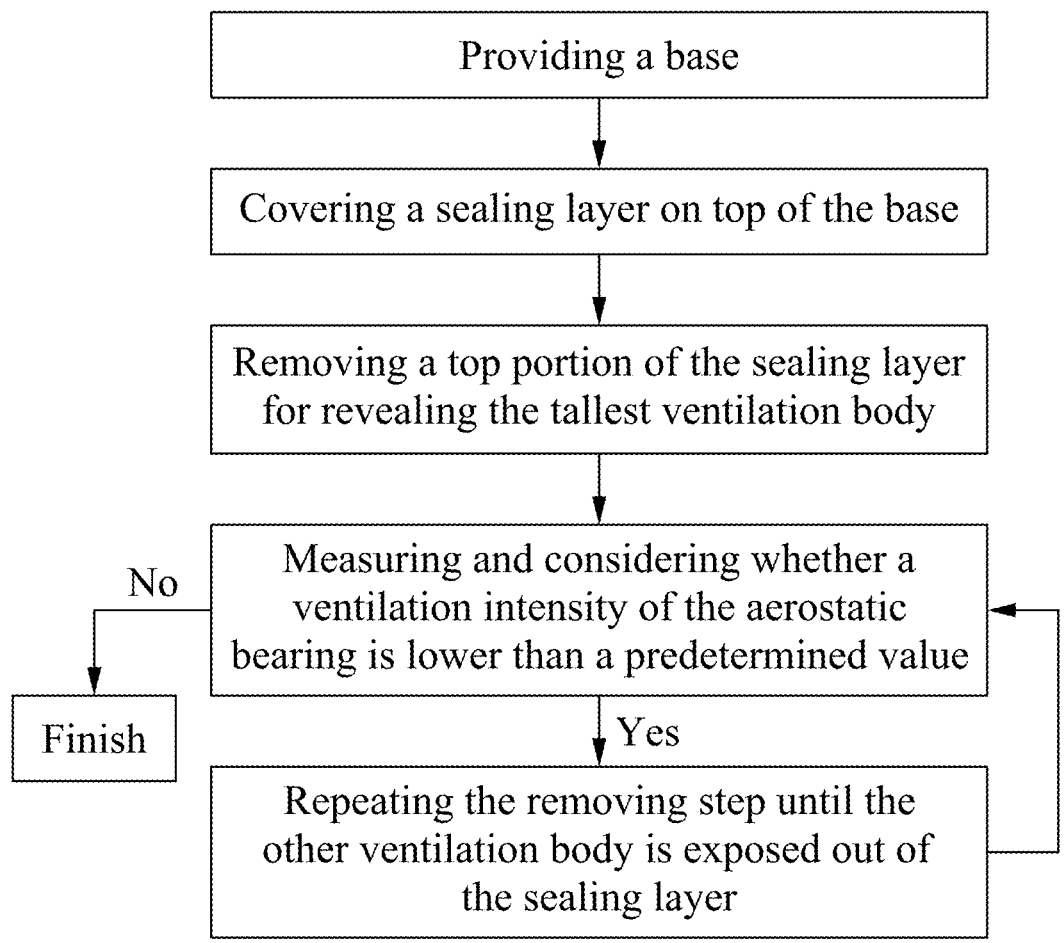
FIG. 7 is a manufacturing flow chart in accordance with a second embodiment of the present invention.
Figure 8C:
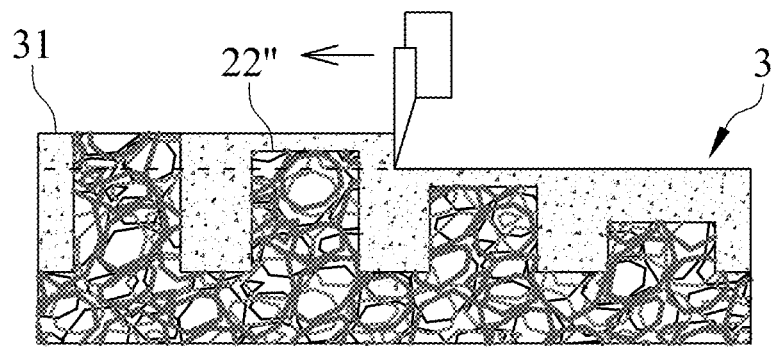
Figure 8D:
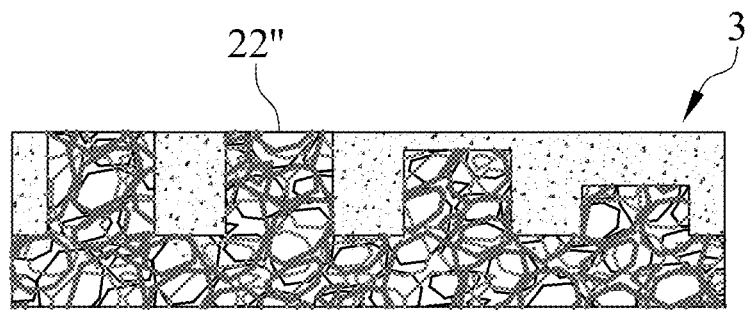

FIG. 7 illustrates a manufacturing flow chart of the second embodiment, and the difference between the second embodiment and the first embodiment is that after removing the top portion 31 of the sealing layer 3 as illustrated in FIG. 8A, the tallest ventilation body 22' is revealed (see FIG. 8B). Once the tallest ventilation body 22' is revealed, a ventilation intensity of the aerostatic bearing is measured. If the ventilation intensity is lower than a predetermined value, then the removing step is repeated as illustrated in FIG. 8C to further remove the top portion 31 of the remained sealing layer 3 until the other ventilation body 22" is exposed out of the sealing layer 3 as illustrated in FIG. 8D. The measuring step and the removing step are repeated until the ventilation intensity of the aerostatic bearing reach the predetermined value.

The second embodiment not only achieves the advantage of the first embodiment but also provides further features. In particular, due to the different heights of the ventilation bodies 22, the number of the revealed ventilation bodies 22 can be adjusted to achieve the desired ventilation intensity of the aerostatic bearing. In the illustrated embodiment, the ventilation bodies 22 are arranged in an order from highest to lowest of the height thereof. Therefore, when repeating the removing step, the revealed ventilation bodies 22 are uniformly spread out from the tallest ventilation body 22, which may aim at targeting bearing spots for enhancing its bearing capability.

Figure 10A:
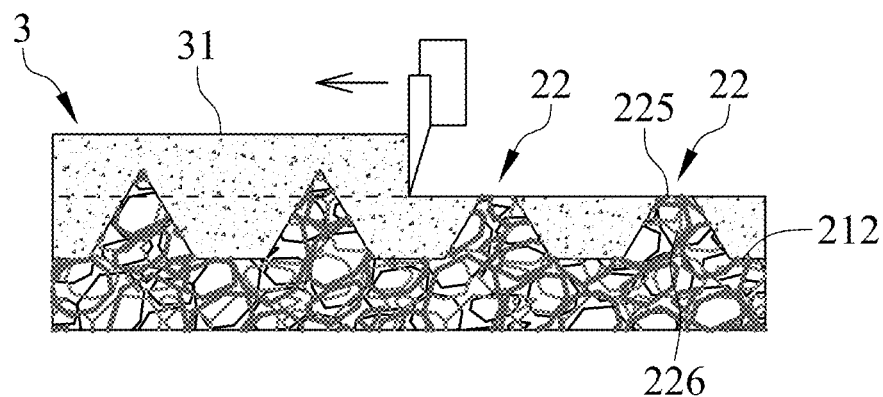
FIGS. 10A to 10C illustrate the manufacturing process of the third embodiment of the present invention.
Figure 10B:
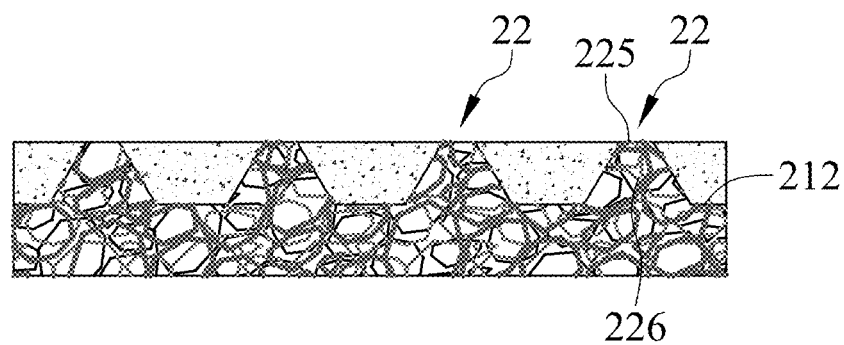

FIG. 10B illustrates a third embodiment of the present invention. The structure of the third embodiment is mostly the same with the first embodiment except that a top portion 225 of each of the ventilation bodies 22 comprises a cross section substantially parallel to the top surface 212 of the foundation layer 21, a bottom portion 226 of each of the ventilation bodies 22 comprises a cross section substantially parallel to the top surface 212 of the foundation layer 21 as well, and the cross section of the top portion 225 is smaller than the cross section of the bottom portion 226 in each ventilation body 22. In an embodiment, each of the ventilation bodies 22 has a tapered shape; in other words, the cross section of each of the ventilation bodies 22 gradually becomes larger from top to bottom.

Figure 9:
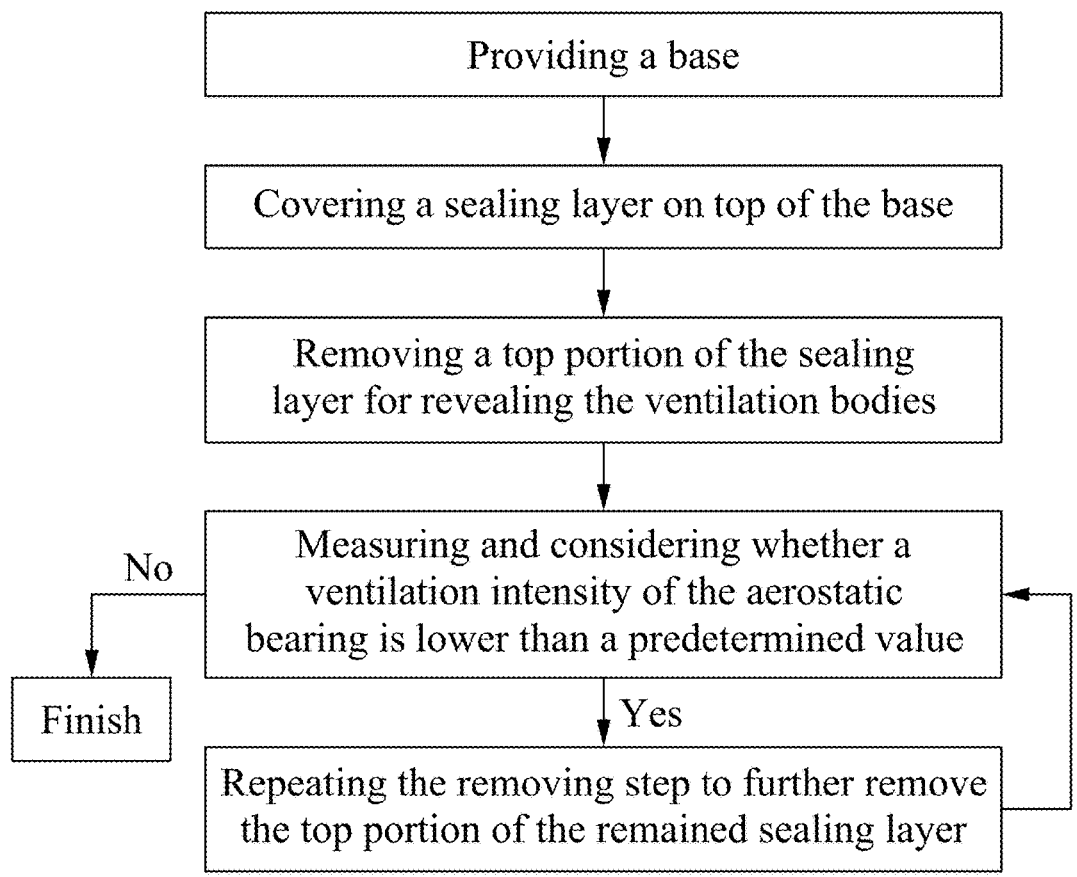
FIG. 9 is a manufacturing flow chart in accordance with a third embodiment of the present invention.
Figure 10C:
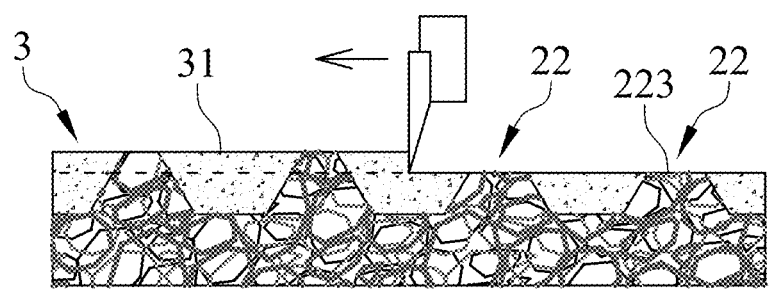

FIG. 9 illustrates a manufacturing flow chart of the third embodiment. The difference between the third embodiment and the first embodiment is that after the step of removing the top portion 31 of the sealing layer 3 illustrated in FIG. 10A, the ventilation bodies 22 will be revealed out of the sealing layer 3 illustrated in FIG. 10B. Next, a ventilation intensity of the aerostatic bearing is measured. If the ventilation intensity is lower than a predetermined value, then the removing step is repeated as illustrated in FIG. 10C to further remove the top portion 31 of the remained sealing layer 3 until the measured ventilation intensity of the aerostatic bearing meets the predetermined value.

The third embodiment not only achieves the advantage of the first embodiment but also provides further features. Since the cross section of the ventilation bodies 22 gradually becomes larger from top to bottom, by repeating the removing step and the measuring step, the revealed surface 223 of the ventilation bodies 22 will become larger, thereby by achieving the desired ventilation intensity of the aerostatic bearing.

The present invention divides a chunk of porous material into a plurality of ventilation bodies 22 with small volume to achieve restrictive function such that the ventilation intensity will not be affected by production variance of the porous material. In addition, the distribution pattern of the ventilation bodies 22 can be designed to adjust ventilation intensity and bearing capability for a variety of applications. Furthermore, with the structure design of different heights of the ventilation bodies 22, or the tapered shape of the ventilation bodies 22, the ventilation intensity of the aerostatic bearing is adjustable. Therefore, the aerostatic bearing can be applied for practical industry applications.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A manufacturing method of aerostatic bearing comprising:
    providing a base having a foundation layer and a plurality of protruding bodies protruding from the foundation layer, the protruding bodies being made of a porous material, wherein at least two of the protruding bodies are spaced apart from each other;
    covering a sealing layer on the base, the sealing layer covers the protruding bodies and fills between two spaced apart protruding bodies, wherein a plurality of micro pores of a lateral periphery and a top surface of each of the protruding bodies are sealed by the sealing layer and become airtight; and
    removing a top portion of the sealing layer for revealing at least one of the protruding body.

2. The manufacturing method of aerostatic bearing in accordance with claim 1, wherein each of the protruding bodies comprises an outer lateral periphery facing an edge of the base is sealed by the sealing layer.

3. The manufacturing method of aerostatic bearing in accordance with claim 2, wherein each of the protruding bodies comprises an inner lateral periphery facing a center of the base is sealed by the sealing layer.

4. The manufacturing method of aerostatic bearing in accordance with claim 1, wherein at least two of the protruding bodies have different heights.

5. The manufacturing method of aerostatic bearing in accordance with claim 4, wherein all of the protruding bodies have different heights.

6. The manufacturing method of aerostatic bearing in accordance with claim 4, wherein after removing the top portion of the sealing layer and the tallest protruding body is revealed, a ventilation intensity of the aerostatic bearing is measured, when the ventilation intensity is lower than a predetermined value, repeat removing the sealing layer until the other protruding body is exposed out of the sealing layer.

7. The manufacturing method of aerostatic bearing in accordance with claim 5, wherein after removing the top portion of the sealing layer and the tallest protruding body is revealed, a ventilation intensity of the aerostatic bearing is measured, when the ventilation intensity is lower than a predetermined value, repeat removing the sealing layer until the other protruding body is exposed out of the sealing layer.

8. The manufacturing method of aerostatic bearing in accordance with claim 5, wherein the protruding bodies are arranged in an order from highest to lowest of the height thereof.

9. The manufacturing method of aerostatic bearing in accordance with claim 1, wherein a top portion of each of the protruding bodies comprises a cross section substantially parallel to an top surface of the foundation layer, a bottom portion of each of the protruding bodies comprises a cross section substantially parallel to the top surface of the foundation layer, wherein the cross section of the top portion is smaller than the cross section of the bottom portion in each protruding body.

10. The manufacturing method of aerostatic bearing in accordance with claim 9, wherein each of the protruding bodies has a tapered shape.

11. The manufacturing method of aerostatic bearing in accordance with claim 9, wherein after removing the top portion of the sealing layer, a ventilation intensity of the aerostatic bearing is measured, when the ventilation intensity is lower than a predetermined value, repeat removing the sealing layer until the ventilation intensity is not lower than the predetermined value.

12. The manufacturing method of aerostatic bearing in accordance with claim 10, wherein after removing the top portion of the sealing layer, a ventilation intensity of the aerostatic bearing is measured, when the ventilation intensity is lower than a predetermined value, repeat removing the sealing layer until the ventilation intensity is not lower than the predetermined value.

13. The manufacturing method of aerostatic bearing in accordance with claim 1, wherein the foundation layer is made of the porous material or a different porous material.

14. The manufacturing method of aerostatic bearing in accordance with claim 1, wherein the foundation layer is made of a substantially non-ventilative material, and comprises a plurality of through holes, each of the protruding bodies covers a corresponding one of the through holes.

15. The manufacturing method of aerostatic bearing in accordance with claim 14, wherein a plurality of accommodating slots are recessed into an top surface of the foundation layer, the through holes directly communicate with the accommodating slots, and the protruding bodies are disposed within the accommodating slots.

16. The manufacturing method of aerostatic bearing in accordance with claim 1, wherein the sealing layer is a sealing gel, and a curing step performed after the sealing layer covered the base to cure the sealing gel.

17. The manufacturing method of aerostatic bearing in accordance with claim 1, wherein the sealing layer is a metal membrane, and the metal membrane is deposited on the base by vacuum sputtering, vacuum vaporization or ion implantation.

* * * * *